United States Patent
Bodmer et al.

(10) Patent No.: US 8,793,450 B2
(45) Date of Patent: Jul. 29, 2014

(54) METHOD AND APPARATUS FOR AN IMPROVED FILE REPOSITORY

(75) Inventors: Brian Bodmer, Santa Cruz, CA (US);
Eric Bodnar, Santa Cruz, CA (US);
Mark Tarantino, Santa Cruz, CA (US);
Jonah Kaj Fleming, Santa Cruz, CA (US); Devdutt Sheth, Santa Cruz, CA (US)

(73) Assignee: Verisign, Inc., Reston, VA (US)

( * ) Notice: Subject to any disclaimer, the term of this patent is extended or adjusted under 35 U.S.C. 154(b) by 0 days.

(21) Appl. No.: 13/330,673

(22) Filed: Dec. 20, 2011

(65) Prior Publication Data
US 2012/0096311 A1    Apr. 19, 2012

Related U.S. Application Data

(63) Continuation of application No. 12/773,111, filed on May 4, 2010, now Pat. No. 8,082,412, which is a continuation of application No. 10/954,380, filed on Sep. 29, 2004, now Pat. No. 7,761,678.

(51) Int. Cl.
| | | |
|---|---|---|
| *G06F 12/00* | (2006.01) | |
| *G06F 7/00* | (2006.01) | |
| *G01N 37/00* | (2006.01) | |

(52) U.S. Cl.
USPC ............ 711/162; 707/638; 707/695; 702/81; 711/E12.103

(58) Field of Classification Search
USPC ................... 711/162; 702/81; 707/638, 695
See application file for complete search history.

(56) References Cited

U.S. PATENT DOCUMENTS

| | | | |
|---|---|---|---|
| 5,485,571 A | 1/1996 | Menon | |
| 5,485,606 A | 1/1996 | Midgdey et al. | |
| 5,761,179 A | 6/1998 | Iwasaki et al. | |
| 5,790,775 A | 8/1998 | Marks et al. | |
| 5,831,617 A | 11/1998 | Bhukhanwala | |
| 6,148,412 A | 11/2000 | Cannon et al. | |
| 6,266,753 B1 | 7/2001 | Hicok et al. | |
| 6,269,382 B1 | 7/2001 | Cabrera et al. | |
| 6,446,162 B1 | 9/2002 | Korst et al. | |
| 6,449,688 B1 | 9/2002 | Peters et al. | |
| 6,505,306 B1 | 1/2003 | Blackmon et al. | |
| 6,584,476 B1 * | 6/2003 | Chatterjee et al. ..................... 1/1 |
| 6,845,434 B2 * | 1/2005 | Lin ............................... 711/162 |
| 6,901,493 B1 | 5/2005 | Maffezzoni | |
| 6,922,762 B2 | 7/2005 | Hirakawa et al. | |
| 7,120,751 B1 | 10/2006 | Endo et al. | |
| 7,152,142 B1 | 12/2006 | Guha et al. | |
| 7,698,348 B2 * | 4/2010 | Walker et al. ................. 707/790 |
| 7,778,812 B2 * | 8/2010 | Hoffman, Jr. ................... 703/14 |
| 2002/0091786 A1 | 7/2002 | Yamaguchi et al. | |
| 2002/0156761 A1 | 10/2002 | Chen et al. | |

(Continued)

FOREIGN PATENT DOCUMENTS

| | | | |
|---|---|---|---|
| CA | 24447963 A1 | 4/2005 | |
| WO | WO 03094416 A1 * | 11/2003 | |

*Primary Examiner* — Aracelis Ruiz
(74) *Attorney, Agent, or Firm* — MH2 Technology Law Group, LLP

(57) ABSTRACT

A method and apparatus for of storing data comprising monitoring a plurality of storage units within a mass storage area and detecting when a storage unit within the mass storage area is overloaded. The method further comprising randomly distributing the data on the overloaded storage unit to the other storage units within the mass storage area.

18 Claims, 8 Drawing Sheets

(56) References Cited

U.S. PATENT DOCUMENTS

| | | | |
|---|---|---|---|
| 2002/0169934 A1* | 11/2002 | Krapp et al. | 711/159 |
| 2003/0182350 A1* | 9/2003 | Dewey | 709/100 |
| 2003/0200235 A1* | 10/2003 | Choy et al. | 707/203 |
| 2003/0212872 A1 | 11/2003 | Patterson et al. | |
| 2003/0236906 A1* | 12/2003 | Klemets et al. | 709/231 |
| 2004/0230594 A1* | 11/2004 | Flam et al. | 707/100 |
| 2004/0236905 A1* | 11/2004 | Dixon | 711/113 |
| 2004/0260726 A1 | 12/2004 | Hrle et al. | |
| 2004/0260973 A1 | 12/2004 | Michelman | |
| 2005/0094878 A1* | 5/2005 | Becker | 382/205 |
| 2005/0097541 A1 | 5/2005 | Holland | |
| 2005/0193084 A1* | 9/2005 | Todd et al. | 709/214 |
| 2005/0283662 A1 | 12/2005 | Li et al. | |
| 2006/0004876 A1 | 1/2006 | Matsunami et al. | |

* cited by examiner

METHOD AND APPARATUS FOR AN IMPROVED FILE REPOSITORY

CROSS-REFERENCES TO RELATED APPLICATIONS

This is a continuation of U.S. application Ser. No. 12/773,111, now U.S. Pat. No. 8,082,412 filed May 4, 2010, which is a continuation of and claims priority from U.S. application Ser. No. 10/954,380, now U.S. Pat. No. 7,761,678, filed Sep. 29, 2004, all of which are incorporated herein by reference.

FIELD OF THE INVENTION

The present invention relates to data storage, and more particularly to an improved method of storing data.

BACKGROUND OF THE INVENTION

Larger and larger quantities of data is stored on servers, as users store their photographs, videos, audio files, movies, and other multimedia data on servers. As the number of servers is increased, and the amount of data is increasing, it is becoming increasing difficult to keep up with storage needs.

FIG. 1 illustrates one embodiment of prior art storage. The process starts at block 110. At block 120, a storage request is received from the user. At block 130, the data is stored on the current storage unit. At block 140, the process determines whether a storage unit is full or failing. In one embodiment, the system monitors the storage unit state continuously. If a storage unit is failing or becoming full, at block 150, an administrator is notified to manually migrate data to a new storage unit. In the prior art, data was manually moved from one storage unit to another and any additional storage volumes and mount points were manually added to the system configuration. However, as the volume of data increases, this places a significant load on administrators, and may lead to storage units failing before an administrator is able to fix the problem or to failure conditions introduced by human error.

BRIEF SUMMARY OF THE INVENTION

A method and apparatus for of storing data comprising monitoring a plurality of storage units within a mass storage area and detecting when a storage unit within the mass storage area is overloaded. The method further comprising randomly distributing the data on the overloaded storage unit to the other storage units within the mass storage area.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for a file repository is described. The file repository includes a mass storage area, including a plurality of storage units, in one embodiment. The storage units are individually addressable and can represent both logical as well as physical units of storage. Storage units may have dissimilar characteristics, including but not limited to differences in size, performance and access time. Storage units may include, but are not limited to: disk drives, RAID arrays, flash memory, optical storage devices, and tapes. The file repository rebalances the data within the mass storage area among the various storage units. Rebalancing moves data between the storage units or other storage units on the mass storage area.

In one embodiment, the file repository of the present invention automatically detects when rebalancing would be useful. In one embodiment, rebalancing may be useful if one or more of the storage units (henceforth referred to as storage units, although they may be storage units, optical storage devices, or other types of storage) are running "hot" (i.e. are being used frequently). In one embodiment, rebalancing may be useful if one of the storage units is failing.

The rebalancing, in one embodiment, randomly redistributes the data from any hot or failing storage unit to a "cooler" (less active) and functioning storage unit. The random spray redistribution among "cool" running storage units means that there is no need for an administrator to determine where and how to migrate the data from a failing or hot storage unit. Rather, the system automatically takes care of such redistribution. Furthermore, if the system runs low on space, the administrator need only add one or more additional storage units to the system. The system can then automatically mount, configure and characterize the new storage units and then migrate data as needed to ensure that all access requests can be served. In one embodiment, the system also migrates data to balance the load among the storage units.

Figure 1:
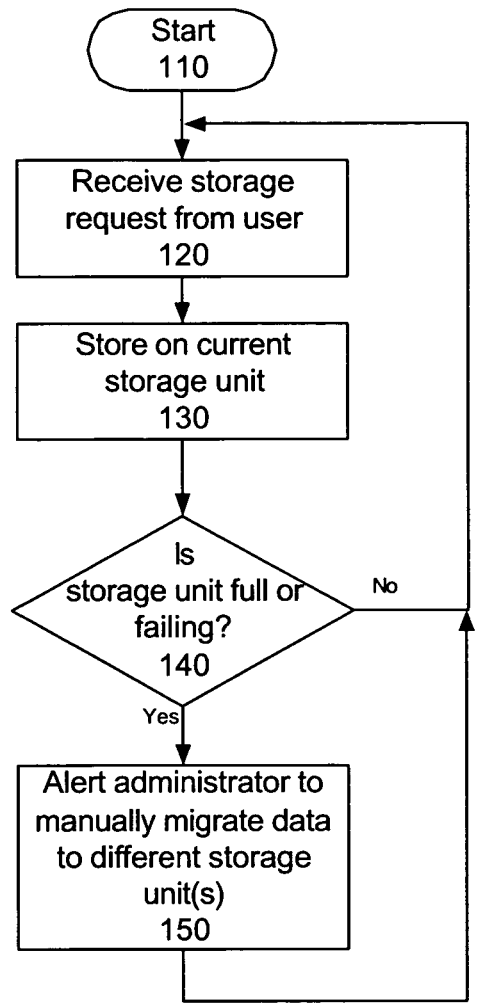
FIG. 1 is a flowchart of a prior art method of using a file repository.
Figure 2:
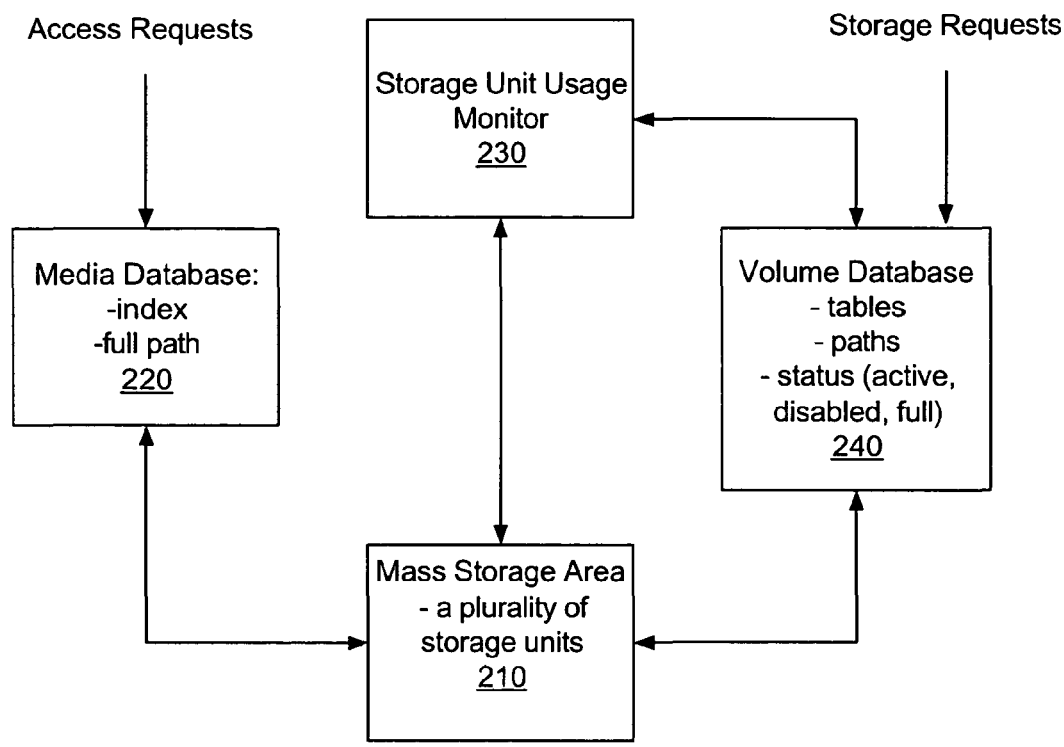
FIG. 2 is a block diagram of one embodiment of a network for a file repository.

FIG. 2 is a block diagram of one embodiment of a network for a file repository. The mass storage area 210 includes multiple storage units. Volume database 240 tracks the status of each of the storage units in the mass storage area 210. Volume database 240 is used to respond to storage requests. The file repository uses volume database 240 to determine which storage units are active. In one embodiment, the status of a storage unit may be active, i.e. storage available, disabled, i.e. storage unit not available for reading or writing, and full, i.e. storage unit available for reads but not for further storage.

The media database 220 includes the index and the full path to each stored media data element. When access requests come in, the media database 220 is used to identify the location of the data, and allows the system to retrieve the data. When new data is stored in the storage unit of the mass storage area 210, the path is stored in the media database 220, and its data is added to the index in the media database 220.

Storage unit usage monitor 230 monitors the state all of the storage units within the mass storage area 210. The storage unit usage monitor 230, in one embodiment may be used to rebalance the data among the available volumes in the storage units of the mass storage area 210.

Figure 3:
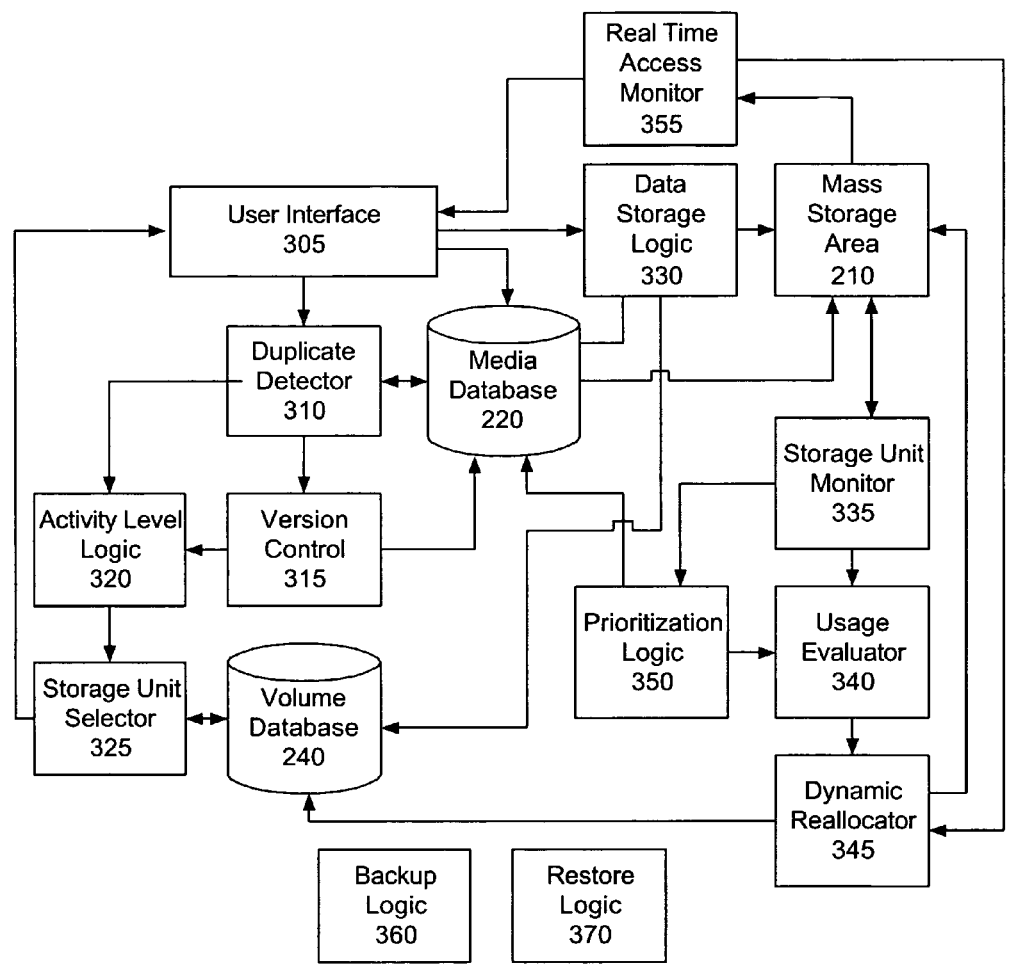
FIG. 3 is a block diagram of one embodiment of the repository manager.

FIG. 3 is a block diagram of one embodiment of the file repository manager. The user interface 305 permits the user to request to store data in the storage array 210 and read data from the storage array 210.

When the user request to store data in the storage array 210, the duplicate detector 310 determines whether a copy of the media being stored already exists in the storage array 210. In one embodiment, each media element has a unique identifier. The system determines whether the media with the unique identifier already exists in the storage array 210. Version control 315 handles duplicate media. In one embodiment, the user may set the version control preferences. In another embodiment, an administrator may set the preferences. The version control preference may be to replace stored data, if a better quality version of the same data is received. The version control preference may be to store the data, and flag the lower quality version to indicate that a higher quality version is available. The version control preference may be to store the better quality version, and delete the older version. The version control preference may also be used to track a history of changes to the data.

If the version control 315 determines that the policy is to store the new version in a new location, the standard location determination process is used.

The activity level logic 320, in one embodiment, is used to predict a level of activity for the data being stored. In one embodiment, the activity level logic 320 determines the data type. In general, certain types of data are accessed more frequently than others. For example, a presentation may be accessed more frequently than a personal snap-shot. In one embodiment, the user's own track record is used to determine activity level.

Storage unit selector 325 selects a storage unit to which the data should be stored. Storage unit selector, in one embodiment, uses volume database 240 to identify a storage unit which is available, and not overloaded. In one embodiment, storage unit selector 325 uses activity level information to select a storage unit. In one embodiment, storage unit selector uses priority information from monitor and priority evaluator 350 to make this determination. For example, the data from higher value subscribers may be stored on a faster storage unit, to ensure faster access.

The path to the destination storage unit, constructed by storage unit selector 325, is passed through user interface 305 to the user's system. The returning data, including its destination path are used by the data storage logic 330 to store the data in the storage array 210, and to add the information and the full path to the media database 220. In one embodiment, the data storage logic 330 also adds the path and table data to the volume database 240.

Storage unit monitor 335 monitors all of the storage units in the storage array 210. In one embodiment, storage unit monitor 335 tracks the level of data on each storage unit, as well as the storage unit state. For example, the storage unit monitor 335 will determine if a storage unit is running hot, i.e. has a large number of accesses. The storage unit monitor 335, in one embodiment, will also track the storage unit state, to determine whether one or more of the storage units are going to fail. Storage unit failure is an electronic, mechanical, or logical failure. The storage unit monitor 335, in one embodiment, monitors for all of these types of failure. When possible, the storage unit monitor 335 attempts to remove all the data from and decommission a storage unit prior to failure. In one embodiment, a failure condition on a storage unit can be manually induced (e.g. if an administrator wished to decommission a working storage unit for any reason, such as for a hardware upgrade).

Prioritizer 350, in one embodiment, prioritizes the files that should be moved, by level of use. Prioritizer 350, in one embodiment, provides an aging priority function, so that older files, which are generally less frequently accessed, are lower priority for moving from a hot storage unit to another storage unit. Alternative methods of prioritizing may be used as well.

In one embodiment, prioritizer 350 receives data from real time access monitor 355 which provides real-time data for the frequency of access to various files in the storage array 210. Prioritizer 350 can then use the real-time data to determine which files to move.

Usage evaluator 340 evaluates the usage level of each of the storage units, and determines how to rearrange the data. In one embodiment, the usage evaluator 340 provides a scheme for rearranging the data in the storage array 210 to free up any failing storage units, or to remove some of the load from a hot storage unit. In one embodiment, usage evaluator 340 weights each storage unit. Weighting, in one embodiment, consists of a number of contributing factors, including but no limited to the following: space available, access frequency, storage unit response time, average storage unit density, average store unit size. In one embodiment, according to the weighing algorithm, less available space, higher access frequency, lower response time and larger average unit density all contribute to an increased "hotness" weight.

Dynamic reallocator 345 takes the data from usage evaluator 340, and actually performs the redistribution. In one embodiment, dynamic reallocator 345 uses a random spray pattern to distribute data. In another embodiment, dynamic reallocator 345 uses a balancing algorithm to attempt to distribute load evenly among the storage units. In one embodiment, dynamic reallocator 345 moves highest priority items from the hottest storage units first, and moves them to the coolest storage units. The dynamic reallocator 345 uses continuous storage unit monitoring, in one embodiment, to continuously move data between the storage units, thereby providing dynamic balancing. In another embodiment, the dynamic reallocator 345 operates periodically, when one or more storage units are either overwhelmed or failing.

In one embodiment, dynamic reallocator 345 also updates the index and path information in the media database 220, as files are moved, as well as the status of any storage units taken off-line, or made full, in the volume database 240.

When the user wishes to access data, the request comes in through user interface 305. The media database 220 is used to determine the full path to the data in the storage array 210. The user interface then retrieves the data from the storage array 210, and provides it to the user.

Backup logic 360 determines when a backup is needed, and administers the process. In one embodiment, a backup may be triggered through the user interface 305. The backup process is described in more detail below, with respect to FIG. 7. Restoration from backup is managed by restore logic 370. In one embodiment, restoration is triggered by disk monitor 335, which identifies failing storage units or corrupted files. The restoration from backup is described in more detail below with respect to FIG. 8.

In this way, the file repository provides an improved method of storing and retrieving data. In one embodiment, the file repository includes version control. In one embodiment, the file repository includes a separate volume database to track the state of each of a plurality of storage units in a mass storage area. In one embodiment, the mass storage area may be a distributed storage device, such as multiple unconnected RAID (redundant array of inexpensive storage units) storage units.

Figure 4:
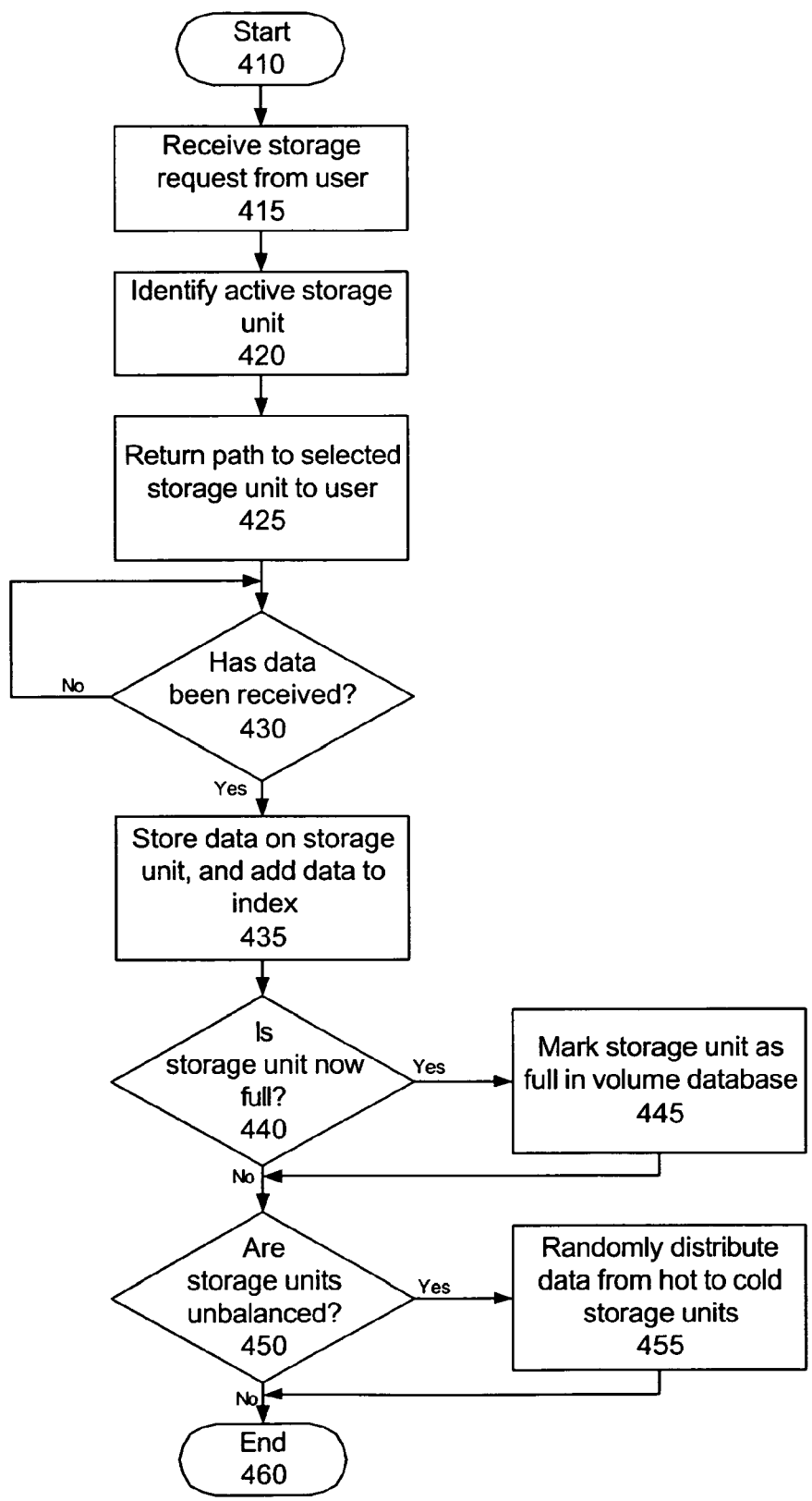
FIG. 4 is an overview flowchart of one embodiment of using the repository.

FIG. 4 is an overview flowchart of one embodiment of using the repository. The process starts at block 410. At block 415, a storage request is received from the user. At block 420, the active storage unit(s), to which new data may be added, are identified. In one embodiment, volume database is consulted, and all storage units which are labeled "active" are retrieved.

At block 425, a storage unit is selected, and a path to the storage location on the selected storage unit is returned to the user. In one embodiment, the active storage unit with the most available space is selected. In one embodiment, the storage unit with the lowest level of load, i.e. fewest read/write requests, is selected. In one embodiment, a storage unit is selected randomly from among the available storage units. The storage path is then returned to the user.

At block 430, the system waits for the data. Note that while this is shown as a loop, the system does not wait for the data, as is known in the art.

At block 435, the data is stored in the location of the path provided. In one embodiment, the user returns the full path with the data, so that no further processing is needed to store the data. The metadata and other related information, including path information, is then stored in the media database.

At block 440, the process determines whether the storage unit on which the data was stored is now full. In one embodiment, the system periodically tests to determine whether there is space left on a storage unit. If the storage unit is full, the storage unit is marked as full in the volume database. This indicates that the storage unit is available for read operations, but not available for write operations. The process then continues to block 450.

In one embodiment, the term "full" in this context means "filled to a predetermined level." For example, the system may set a storage unit as "full" if it reaches 75% available space levels. Alternative levels may be set for marking a storage unit full. In one embodiment, a different level may be sent for making a previously full storage unit "available." For example, while the system may mark a storage unit full if it reaches 75% use, the storage unit may be moved back to active status if the storage level drops below 60%. This ensures that the storage unit is not continuously moved back and forth between available and full status.

At block 450, the process determines whether data needs to be rearranged among the drives. This may be a result of one or more storage units running hot, storage unit failure, unbalanced loads on the storage units, retrieval speed issues, or any other reasons. If so, the process, at block 455, randomly redistributes data. This process is described in more detail below. The process then ends at block 460.

Figure 5:
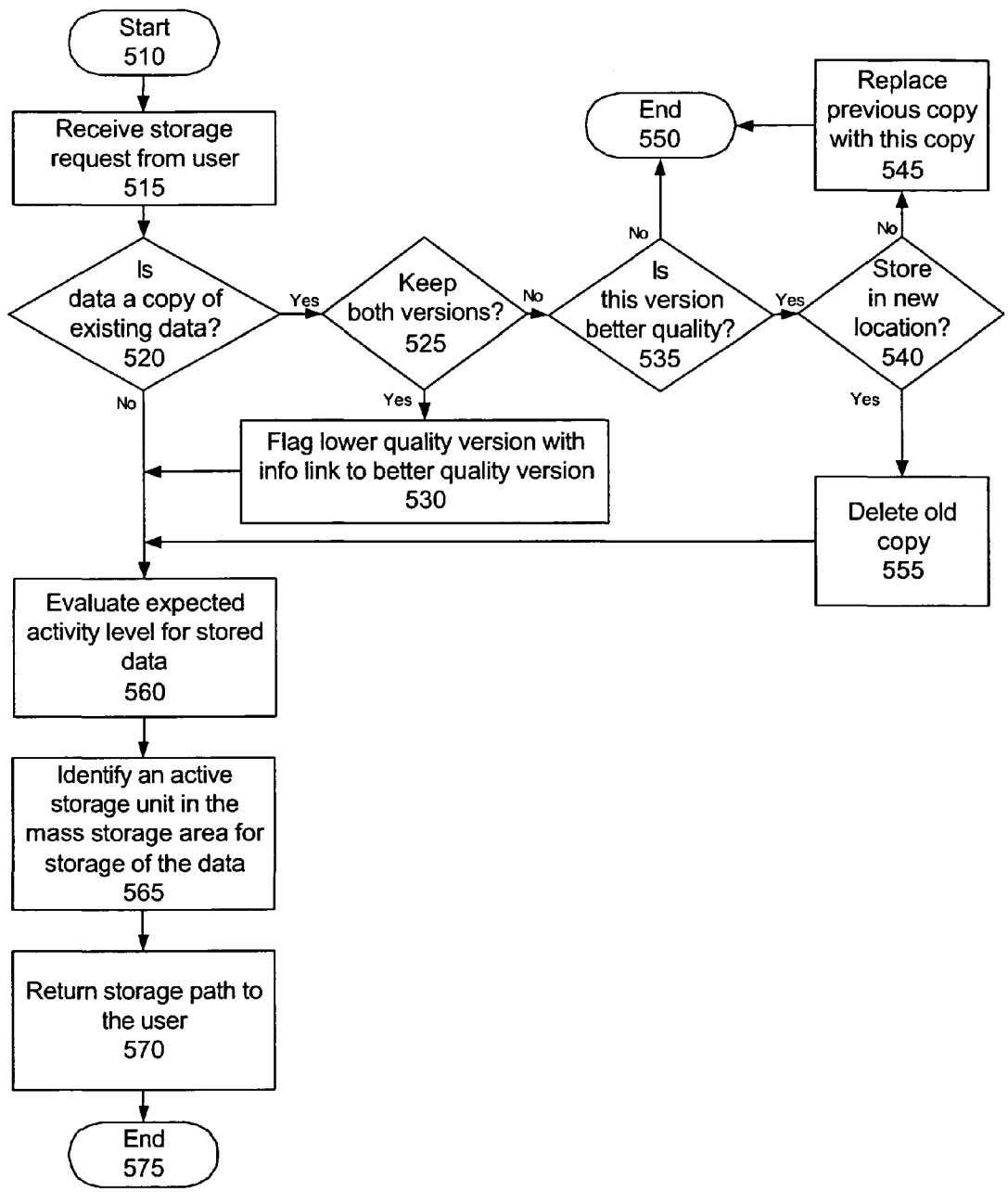
FIG. 5 is a flowchart of one embodiment of storing data in the repository.
Figure 6:
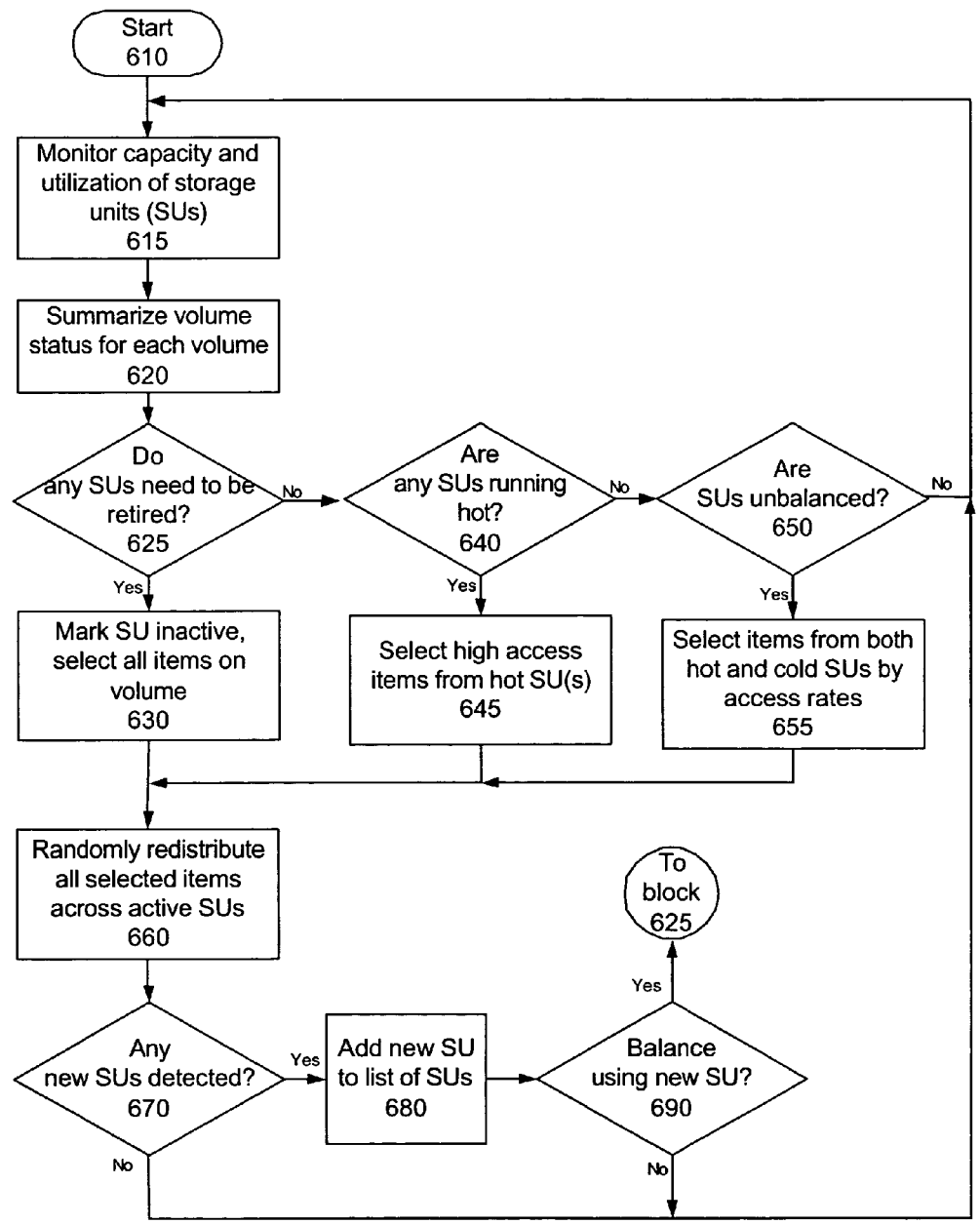
FIG. 6 is a flowchart of one embodiment of data migration.

Note that while FIG. 4, and FIGS. 5 and 6, are shown as flowcharts, the sequence of actions need not be performed in the order shown on the flowchart. Furthermore, while in the flowchart the process is shown "waiting" for an event to occur, as is known in the art, the process may be interrupt driven, or timed in other ways.

FIG. 5 is a flowchart of one embodiment of storing data in the repository. The process starts at block 510. At block 515, a storage request is received from the user. At block 520, the process determines whether the data which the user wishes to store is a copy of already stored data. In one embodiment, media content, such as photographs, videos, etc. have a unique identifier. The system determines whether media content, with the same identifier, already exists in the repository. If it does not, the process continues directly to block 560. If the same identifier already exists in the database, the process continues to block 525.

At block 525, the process determines whether the system is set up to keep both versions. If so, the process continues to block 530. At block 530, the process flags the lower quality image with the information that a higher quality version is available. In one embodiment, the flag is placed once the storage path is determined—shown as block 570. In one embodiment, the flag may indicate the location of the better quality image. The process then continues to block 560.

If, at block 525, the process determined that the setting was not to keep both versions, the process continued to block 535.

At block 535, the process determines whether the new version of the media is better quality. If the new version is not better quality, the process ends at block 550, since only the best quality image is retained.

If the new image is better quality, the process continues to block 540. At block 540, the process determines whether the new image should be stored in the same location as the old image, i.e. whether the new image should simply replace the old image. If so, at block 545, the higher quality image replaces the previous copy. This, in one embodiment, is enabled by setting the "full" setting on a storage unit within a mass storage area to less than 100%. This ensures that even if the storage unit is marked "full" this replacement can take place. The process then ends at block 550.

If the process determines that the new image should be stored in a different location, the process continues to block 555. At block 555, the old image is deleted. The process then continues to block 560.

At block 560, the activity level for the data is evaluated. In one embodiment, this step may be skipped. The activity level may be evaluated based on one or more of the following: data type, data size, user, user's subscription type. In one embodiment, the system keeps statistics of the level of use for each user. In one embodiment, users may have different subscription levels, which provide different bandwidth guarantees. For example, for an additional fee, the file repository may guarantee access speed and bandwidth.

At block 565, an active storage unit that meets all of the requirements is identified. In one embodiment, the system uses the activity level evaluation to determine whether a storage unit has enough bandwidth/access speed to handle the new data. In one embodiment, the active storage unit with the lowest load is selected. In one embodiment, the system selects randomly among all of the active storage units. In one embodiment, the system will attempt to collocate data for a single user on the same storage unit in order to improve data retrieval times of related data items. A storage path to the location on the selected active storage unit is generated.

At block 570, the storage path is returned to the user. The user, when sending the data to be stored, includes the full storage path. Thus, the file repository need not provide further processing. The process then ends at block 575.

FIG. 6 is a flowchart of one embodiment of data migration. The process starts at block 610.

At block 615, the system monitors the storage unit capacity and utilization level of the storage unit within the mass storage area. In one embodiment, this monitoring process is continuous. In another embodiment, the monitoring process is periodic, for example, once a day. In another embodiment, the monitoring process is triggered by alarm (e.g. volume full). In one embodiment, the monitoring process collects data about each storage unit when that storage unit is in an idle mode. In one embodiment, each storage unit has a separate monitoring logic associated with it, which monitors for number of accesses, and monitors for failure. In that embodiment, a cumulative monitor collects the data from each of the storage unit monitors, to perform comparisons between each of the storage units within a mass storage area.

At block 620, the volume status for each storage unit in the mass storage area is summarized. In one embodiment, this comprises updating the status of each of the storage units in the volume database described above.

At block 625, the process determines whether any volumes need to be retired. In one embodiment, the system detects if any storage units are showing errors indicating that they may fail. In one embodiment, each storage unit includes a monitor to ensure that the storage unit is in good shape. When the storage unit starts to show errors, or otherwise indicate that it may fail, the system flags the storage unit for retirement.

If one or more storage units need to be retired, the process continues to block 630. At block 630, the storage unit is marked inactive, and all items on the storage unit are selected.

At block 660, the selected files are randomly distributed among the active volumes. In one embodiment, the random distribution randomly selects a destination unit for each file, as it is selected. Alternative methods of selecting a destination storage unit within a mass storage area for each file may be used.

At block 670, the process determines whether one or more new storage units have been detected. The administrator may add new storage units to the mass storage area. In one embodiment, the addition of new storage units automatically triggers this process. In another embodiment, the detection of new storage units, shown as blocks 670 through 680, is a separate process automatically triggered. In another embodiment, the monitor detects the addition of a new storage unit, whenever the monitor is run. By providing such auto-detection, the process enables the addition of new storage units to the mass storage area without significant administrator effort. The storage unit is simply added to the available storage units within the mass storage area. The system takes care of the rest. If a new storage unit is detected, the process continues to block 675. If no new storage unit is detected, the process returns to block 615, to continue monitoring the storage units in the mass storage area.

At block 675, the process determines whether the set-up is to use the new storage unit for balancing. In one embodiment, the process may be set up to perform load balancing whenever a new storage unit is added to the mass storage. In another embodiment, the process may mark the new storage unit as "active" and "low load" to encourage the storage of new data on the storage unit. In one embodiment, the process may simply mark the new storage unit as "Available."

If the new storage unit is designed for balancing, at block 680, the process selects items from other storage units and adds them to the new storage unit. In one embodiment, files are randomly selected, and sprayed on the new storage unit. In another embodiment, the existing storage units are weighted. Data is selected from storage units with high scores in the weighting algorithm. This enables the migration of data from "hot" devices to the new storage unit. The process then continues to block 615, to continue monitoring the storage units.

If at block 625, the process did not find any storage units that needed to be retired, the process continues to block 640.

At block 640, the process determines whether any of the storage units in the mass storage area are running hot. Running hot means that a storage unit has a large amount of read or write activity. In one embodiment, the level of access that is deemed "running hot" is preset. For example, if a storage unit has enough bandwidth to transfer up to 100 Mb/s (megabits per second), if the transfer load is at 80% of that, the system may determine that the storage unit is running hot. In another embodiment, the transfer rate may be considered running hot, regardless of the bandwidth of the storage unit. That is, whenever a storage unit has a load of 80 Mb/s+, the storage unit is deemed to be running hot. If this method is used, in one embodiment, the slowest storage unit is taken as the baseline. In one embodiment, each of the storage units within the mass storage area is evaluated using a weighting algorithm. Weighting, in one embodiment, consists of a number of contributing factors, including but not limited to the following: space available, access frequency, storage unit response time, average storage unit density, and average storage unit size. In one embodiment, the hotter a machine is, i.e. the lower its available space and higher its access frequency, the lower its weight according to the weighing algorithm.

If one or more of the storage units are running hot, i.e. are above a set maximum baseline, the process continues to block 645. At block 645, the high access items are selected from the storage units that are running hot. In one embodiment, the system uses SMTP accesses to track the access level for files. In one embodiment, files with high access levels are tagged, and prioritized for removal from storage units that are running hot. In another embodiment, only cumulative data is collected. In that embodiment, a percentage of the total files on the storage unit are selected. In one embodiment, this is done randomly. In another embodiment, files are prioritized according to storage date. That is, files that are newer are higher priority for removal than older files. Thus, the newest files are selected.

The process then continues to block 660, and the selected files are randomly distributed. In one embodiment, the random distribution does not add new files to those storage units that were tagged as running hot. Thus, the process distributes the files randomly among those files that are marked "active" but are not running hot. In another embodiment, the process randomly sprays the files amongst the highest, equally weighted storage units, within a given tolerance.

If at block 640, the process found no drives running hot, the process continues to block 650, to determine whether the storage unit loads are unbalanced. In one embodiment, unbalanced means that one or more storage units have significantly higher loads on them (read/write cycles) than other storage units. In one embodiment, if the volumes are unbalanced, the process continues to block 655. At block 655, files are selected for moving. In one embodiment, hot and cold files (files with high access rates and files with low access rates) are selected. In another embodiment, only files with high access rates are selected, from hot storage units. In one embodiment, random files from hot storage units are selected. In one embodiment, the process randomly sprays the files amongst the highest, equally weighted storage units, within a given tolerance. Alternative file selections, for rebalancing the volumes, may be selected.

At block 660, the selected files are randomly distributed. In one embodiment, hot files are moved to cold storage units, and vice versa. In one embodiment, hot files are moved to cold storage units. The process then continues to block 670.

At block 670, the process determines whether any new storage units have been inserted. In one embodiment, the process asks each of the storage units to send back an identification string. If a new storage unit is detected, the process continues to block 680. Otherwise, the process returns to block 615, to continue monitoring the storage units within a mass storage area.

At block 680, the newly detected storage unit is added to the list of active storage units in the volume database.

At block 690, the process determines whether the new storage units should be balanced. This tests whether the new storage unit should be used to rebalance the load among the existing storage units. Alternatively, the new storage units may simply be used for new data. If the new storage units should be used for balancing, the process continues to block 625, and where the above-described process is used to balance load among the storage units (which now number one or more new active storage units). Otherwise, the process returns to block 615, to continue monitoring the system.

Figure 7:
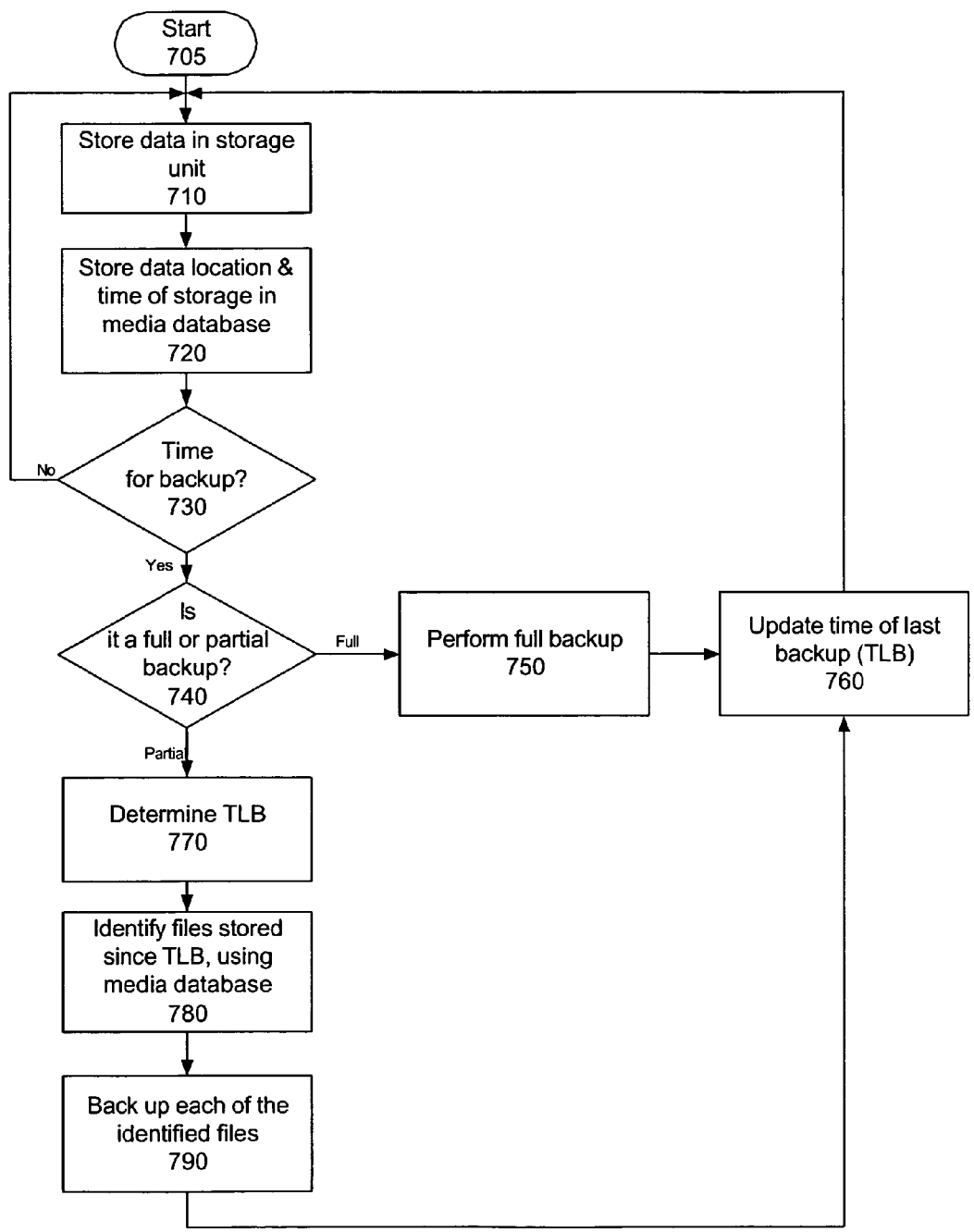
FIG. 7 is a flowchart of one embodiment of data backup, using the file repository.

FIG. 7 is a flowchart of one embodiment of data backup, using the file repository. In any system, where losing data is a problem, it is standard operating procedure to perform backups, to save a copy of the data at periodic intervals. In the prior art, systems performed a scan to detect which data was saved after the last backup. That data is then backed up. However, as the volume of data increases, the time to scan takes longer and longer. Eventually, for very large systems, the time required to scan for and create backups runs longer than the period between backups and the process breaks down.

At block 710, a block of data is stored in the storage array. As described above, the data is randomly sprayed across the available storage units. At block 720, the location(s) of the data are stored in the media database. A time stamp is added to the data in the media database. This time stamp indicates the time at which the data was stored, updated or moved.

At block 730, the process determines whether it is time for a backup. Backups include full backups and partial backups. Partial backups only make a copy of data newly added since the last backup. In one embodiment, partial/full backups are performed periodically. In another embodiment, partial/full backups are performed when a certain amount of new data has been stored. For example, partial backups may be done every hour, while full backups are done every 24 hours. In another embodiment, partial backups may be done every time a gigabyte of new data has been added to the storage array, and full backups may be done on every 10 gigabytes. In another embodiment, partial backups may be done periodically (i.e. every hour) while full backups are done when a certain amount of new data has been added to the storage array. In another embodiment, full backups may be triggered by an administrator. Alternatively, other factors may be used to determine when it is time for a backup. Backup logic 360 determines when a backup is needed, and administers the process.

If it is not time for a backup yet, the process returns to block 710, to continue storing data.

If it is time for a backup, the process continues to block 740. At block 740, the process determines whether the backup is a partial backup or a full backup. If the process is a full backup, the process continues to block 750. At block 750, a full backup is performed. The process then continues to block 760, and the time of last backup is updated. The process then returns to block 720, to continue storing data.

If at block 740, the process was determined to be a partial backup, the process continues to block 770. At block 770, the process determines when the last backup was performed. This information is stored, as shown at block 750, after each backup is performed.

At block 780, the process uses the information in the media database of the file repository, to identify each file that was stored or updated after that time. At block 790, the process backs up each file that was stored or updated after that time. The process then continues to block 760, to update the time of last backup. Note that this process does not require a scan of the storage media to determine what data was stored after the last backup. Rather, the media database in the file repository tracks-this information when the data is stored. This simplifies the backup procedure and greatly reduces the time required to batch and initiate a backup process.

Figure 8:
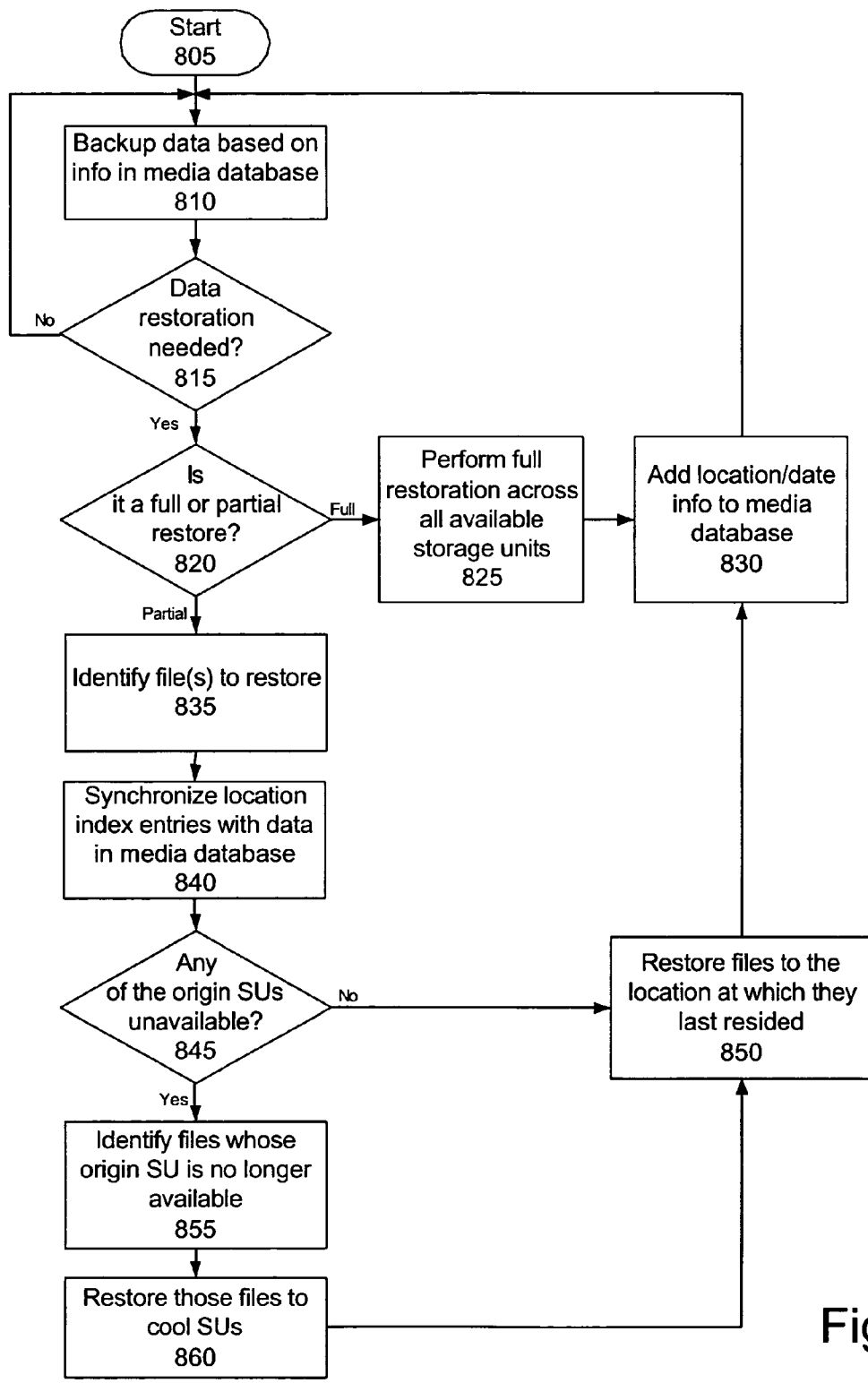
FIG. 8 is a flowchart of one embodiment of restoring from data backup, using the file repository.

FIG. 8 is a flowchart of one embodiment of restoring from the backup. The process starts at block 805. At block 810, the data is backed up.

In one embodiment, the data is backed up in accordance with the flowchart discussed above.

At block 815, the process determines whether data restoration is needed. Data restoration may be needed if one or more files become corrupted, if one or more storage units in the mass storage area become unusable, and cannot be emptied in time, or if the system has some other problem that makes one or more of the files on the mass storage area inaccessible. Of course, catastrophic failures that take out the entire mass storage area may also occur. If no restoration is needed, the process returns to block 810, to continue observing a backup schedule.

In one embodiment, the process tests the integrity of the files and storage units periodically. The periodicity may be determined by down-time, i.e. a test is initiated when the system has a low level of usage. In one embodiment, the media database and volume database further include information about when the integrity of a file/storage unit was last tested. This enables the system to cycle through the testing process. If an uncorrectable error is detected in a file, the restoration is initiated. If a storage unit is failing, the system initially attempts to remove the data from that storage unit, and redistribute it, as described above. However, if that fails, then restoration may be initiated. Other reasons for restoring from backup are known in the art. If restoration is needed, the process continues to block 820.

At block 820, the process determines whether the restoration is a full or partial restore. A full restore restores all of the files on a storage unit, or all of the files on the entire mass storage area. If the process is a full restore, at block 825, the full restore is performed. In one embodiment, the data is distributed across all available storage units. In one embodiment if the data came from a single storage unit, the system stores the restoration data on the same storage unit. In general, the administrator would replace the broken storage unit with a new one, and the new storage unit would receive the same volume ID as the one it replaces. Therefore, the backup system would be able to restore the data to the storage unit with the same volume ID. However, if a duplicate unit volume ID does not exist, the restore process can restore to any storage unit and simply update the database record for the restored file paths to match the new location (restore and relocate).

At block 830, the location/date information is added to the media database. In one embodiment, if the data is restored to the original location, then the media database is simply updated with the "last stored" date since the remaining information—location, original storage date—are already in the media database. The process then returns to block 810, to continue backups and monitoring for restoration.

If at block 820, the process found that the restoration was a partial restoration, the process continues to block 835. At block 835, the file(s) that should be restored are identified. The restore logic 370, in one embodiment, monitors the storage units and files to determine when a restore is needed. In one embodiment, an administrator or user may trigger a restoration. In one embodiment, the list of files to be restored, identified at block 835, may be altered by the administrator/user.

At block 840, the location index entries for the files to be restored are synchronized with the data in the media database. When a file is backed up, its original location is stored as well. However, as described above, files may change locations, as a result of redistribution, or storage unit failure. Therefore, prior to restoration, the process ensures that the stored location for the files is the same as the location as currently known by the media database. If the stored location is incorrect, it is corrected prior to restoration.

At block 845, the process determines whether any of the origin storage units are unavailable. A storage unit may be unavailable due to failure, and failure to replace, fullness, or having too high a usage level.

If all of the original storage units are available, at block 850 the files are restored to the locations at which they last resided. The process then continues to block 830, to update the information in the media database.

If one or more of the origin storage units are unavailable, the process continues to block 855.

At block 855, the files whose origin storage unit is no longer available are identified. Those files are restored to the cool disks—the disks with the lowest load level—at block 860. The process then continues to block 850, where the other files are restored to their original locations.

In the file repository described above, the various monitoring processes are illustrated in flowchart form. One of skill in the art understands that these monitoring and decisioning processes may be performed independently, and/or in parallel. Furthermore, some of these processes (for example the detection of volumes running hot) may be based on monitoring. Thus, instead of a flowchart-like process, separate monitoring processes are triggered, as appropriate.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of managing data on a mass data store comprising:
  receiving a storage request from a user, the storage request comprising new data and a request to store the new data on a mass data store;
  identifying a stored data version of the new data already stored on the mass data store;
  comparing the stored data version with the new data to determine a preferred version and a non-preferred version based on quality;
  determining a storage location in the mass data store for the new data based on one or more of: evaluated activity level, storage unit bad, or collocated user data identification;
  storing the new data;
  retaining the stored data version; and
  flagging the non-preferred version with information that a higher quality version is available.

2. The method of claim 1, wherein comparing the stored version with the new data to determine a preferred version comprises:
  determining a quality attribute corresponding to the stored version;
  determining a second quality attribute corresponding to the new data;
  determining a file date attribute corresponding the stored version;
  determining a second file date attribute corresponding to the new data;
  comparing the quality attribute with the second quality attribute;
  comparing the file date attribute with the second file date attribute; and
  selecting the preferred version from either the stored version or the new data based on the comparing of the quality attributes and file date attributes.

3. The method of claim 1, wherein the information comprises a flag including the storage location of the preferred version.

4. The method of claim 1, comprising:
  maintaining a version identifier for each version of the stored data.

5. The method of claim 1, wherein the evaluated activity level is determined by a method comprising:
  evaluating the activity level for the new data based on at least one of: data type, data size, the user, the user's subscription level, or calculated statistical information for the user.

6. The method of claim 1, further comprising:
  returning a storage path to the user corresponding to the storage location in the mass data store.

7. A non-transitory computer-readable storage medium containing instructions which, when executed on a processor, perform a method
  comprising:
  receiving a storage request from a user, the storage request comprising new data and a request to store the new data on a mass data store;
  identifying a stored data version of the new data already stored on the mass data store;
  comparing the stored version with the new data to determine a preferred version and a non-preferred version based on quality;
  determining a storage location in the mass data store for the new data based on one or more of: an evaluated activity level, storage unit load, or collocated user data identification;
  storing the new data;
  retaining the stored data version; and
  flagging the non-preferred version with information that a higher quality version is available.

8. The computer-readable storage medium of claim 7, wherein comparing the stored version with the new data to determine a preferred version comprises:
  determining a quality attribute corresponding to the stored version;
  determining a second quality attribute corresponding to the new data;
  determining a file date attribute corresponding to the stored version;
  determining a second file date attribute corresponding to the new data;
  comparing the quality attribute with the second quality attribute;
  comparing the file date attribute with the second file date attribute; and
  selecting the preferred version from either the stored version or the new data based on the comparing of the quality attributes and file date attributes.

9. The computer-readable storage medium of claim 7, wherein the information comprises a flag including the storage location of the preferred version.

10. The computer-readable storage medium of claim 7, comprising: maintaining a version identifier for each version of the stored data.

11. The computer-readable storage medium of claim 7, wherein the method further comprises:

returning a storage path to the user corresponding to the storage location in the mass data store.

12. The computer-readable storage medium of claim 7, wherein the evaluated activity level is determined by a method comprising:
   evaluating the activity level for the new data based on at least one of: data type, data size, the user, the user's subscription level, or calculated statistical information for the user.

13. A system for managing data on a mass data store comprising:
   a processor;
   mass data store;
   a non-transitory memory containing instructions which, when executed on the processor, perform a method comprising:
      receiving a storage request from a user, the storage request comprising new data and a request to store the new data on the mass data store;
      identifying a stored data version of the new data already stored on the mass data store;
      comparing the stored version with the new data to determine a preferred version and a non-preferred version based on quality;
      determining a storage location in the mass data store for the new data based on one or more of: an evaluated activity level, storage unit load, or collocated user data identification;
      storing the new data in the glass data store;
      retaining the stored data version; and
      flagging the non-preferred version with information that a higher quality version is available.

14. The system of claim 13, wherein comparing the stored version with the new data to determine a preferred version comprises:
   determining a quality attribute corresponding to the stored version;
   determining a second quality attribute corresponding to the new data;
   determining a the date attribute corresponding to the stored version;
   determining a second file date attribute corresponding to the new data;
   comparing the quality attribute with the second quality attribute;
   comparing the file date attribute with the second the date attribute; and
   selecting the preferred version from either the stored version or the new data based on the comparing of the quality attributes and file date attributes.

15. The system of claim 13, wherein the information comprises a flag including the storage location of the preferred version.

16. The system of claim 13, comprising:
   maintaining a version identifier for each version of the stored data.

17. The system of claim 13, wherein the method further comprises:
   returning a storage path to the user corresponding to the storage location in the mass data store.

18. The system of claim 13, wherein the evaluated activity level is determined by a method comprising:
   evaluating the activity level for the new data based on at least one of: data type, data, size, the user, the user's subscription level, or calculated statistical information for the user.

* * * * *